Mar. 13, 1923.

H. W. WENDT

ROTARY ENGINE

Filed July 14, 1920

1,448,476

INVENTOR
Henry W. Wendt
By J. M. Ellis
ATTORNEY

Patented Mar. 13, 1923.

1,448,476

UNITED STATES PATENT OFFICE.

HENRY W. WENDT, OF BUFFALO, NEW YORK.

ROTARY ENGINE.

Application filed July 14, 1920. Serial No. 396,204.

*To all whom it may concern:*

Be it known that I, HENRY W. WENDT, a citizen of the United States of America, and a resident of the city of Buffalo, county of Erie, and State of New York, have invented certain new and useful Improvements in Rotary Engines, of which the following is a full, clear, and exact description.

My invention relates generally to rotary engines and more particularly to that type of engine in which rotors are provided, each having a plurality of spirally disposed and intermeshing tooth blades.

The principal object of my invention has been to provide an engine of this type in which the steam supply to it shall be cut off and allowed to expand after it is cut off, whereby an efficient and economical engine is made possible.

Another object has been to provide an engine which shall be simple to construct; one cheap to manufacture; and one very durable in its operation.

The above objects, as well as others which will be apparent to those skilled in the art, have been accomplished by the device shown in the accompanying drawings of which:

Figure 1:
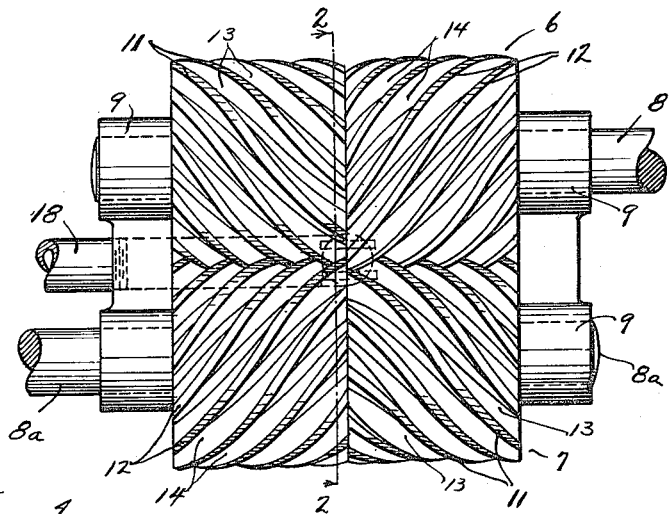
Fig. 1 is a plan view of my device.
Figure 2:
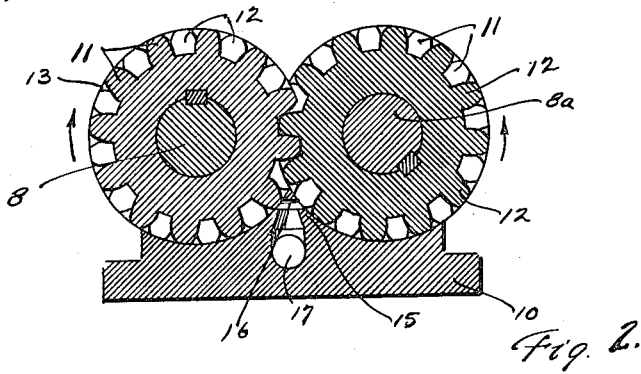
Fig. 2 is a transverse, sectional elevation and is taken on line 2—2 of Fig. 1.

Referring to the drawings, 6 and 7 are the rotors of the engine which are rigidly mounted upon shafts 8 and 8ª, respectively. These shafts are mounted in suitable bearings 9, carried by the base 10 of the engine. The rotor 6 is provided with a plurality of right hand helically arranged tooth blades 11 at its left hand end, and the rotor 7 is likewise provided with a plurality of right hand helically arranged tooth blades 11 at its right hand side. The rotor 6 is provided with a plurality of left hand helically arranged blades 12 at its right hand side, and the rotor 7 is likewise provided with a plurality of left hand helically arranged tooth blades 12. The right and left hand tooth blades of each rotor extend from the ends thereof to substantially the middle portion where they terminate in the same plane. Instead of meeting and joining each other at this central plane, the right and left hand tooth blades 11 and 12, respectively, are so arranged that the ends presented at the plane of intersection are disposed in a staggered arrangement as shown by the cross-sectional view in Fig. 2. Thus, the left hand tooth blades 12 terminate at the center of each of the rotors at a point which is opposite the grooves 13 formed by the right hand tooth blades on the same rotor. Likewise the right hand tooth blades 11 of one rotor have their inner ends arranged opposite the grooves 14 formed by the left hand tooth blades of the same rotor. The rotors are so arranged that the right hand tooth blades 11 of rotor 6 mesh with the left hand tooth blades of rotor 7. In a similar manner the right hand tooth blades of rotor 7 mesh with the left hand tooth blades of rotor 6. By this means transmission of rotation is secured between the two rotors and buckets are thereby formed, whereby propulsion of the rotors is made possible.

Carried by the base 10 and preferably forming an integral part thereof is a rib 15. This rib is disposed beneath the rotors and its upper surface is formed in conformity to the outer peripheries of the rotors and it extends in between the rotors to the point of intersection thereof, whereby the rotors are encased for the portion covered by the rib. The rib extends the entire length of the rotors and is provided in its central portion and near the peak thereof with a lateral inlet port 16. This port is in communication with a passageway 17, to which is connected the inlet pipe 18 of the engine. The extent to which the rib envelops the rotors depends upon the number of tooth blades provided on the rotors and also upon the angular disposition of these tooth blades, it being only necessary that the peripheries of the rotors be covered to a point where the fluid under pressure will be confined to any pair of intermeshing tooth blades until this particular pair of tooth blades ceases to mesh or until the full capacity of each bucket formed between intermeshing blades has been developed. Obviously, if desired, this rib may be extended entirely around the rotors so as to completely encase them. In such a construction, it will be, of course, necessary that suitable provision be made for the exhaust of the fluid when it has reached the ends of the rotors. The inlet port 16 is preferably arranged in a horizontal plane, so that the fluid under pressure will impinge against the tooth blades and exert an impactive action as well as an expansive action.

Figure 3:
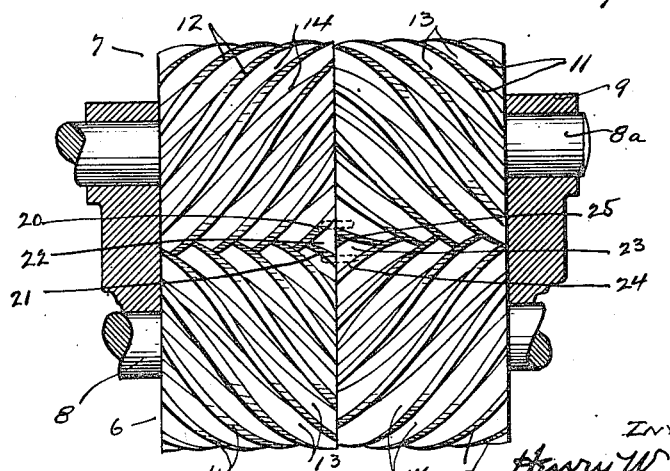
Fig. 3 is a bottom view of the rotors of the engine with portions of the device broken away.

Referring to Fig. 3, where the inlet side of the rotors is exposed, and the position of the inlet port shown by the broken lines, it will be seen that between the left hand tooth blade 20 of rotor 7 and the tooth blade 21 of the rotor 6, there is formed a V-shaped pocket 22. This pocket is continued in pocket 23 formed between the intermeshing left hand tooth blade 24 of rotor 6 and the right hand tooth blade 25 of rotor 7, whereby a bucket is formed. It will be clear that, as the rotors are moving in the direction indicated by the arrows in Fig. 2, this bucket will, because of the rotation, be cut off by the tooth bounding it as it passes the inlet port; and that, as the rotors continue to rotate, the points of intersection of the intermeshing blades will recede from the central plane toward the ends of the rotors, thus giving to the bucket formed between them an ever increasing volume which allows for efficient expansion of the motive fluid. It is evident that the fluid will continue to expand until the bucket formed between intermeshing tooth blades is discontinued at the end of the rotor, whereupon the motive fluid will be exhausted. Clearly, the ratio of expansion may be changed by altering the size and location of the inlet ports or the angle and length of the spirally disposed tooth blades.

Inasmuch as the oppositely arranged tooth blades of each rotor are arranged in staggered relation, the fluid, as it enters any bucket, will pass in a zig-zag path into some of the preceding buckets and this will produce additional impacts on the blades of the rotors. I am aware of the fact that this zig-zag path might permit some leakage of the motive fluid, but this leakage will be reduced to a negligible amount owing to the rapid rotation of the rotors and, in practice, it will be found that my invention will be very efficient in operation.

Having thus described my invention what I claim is:

1. A rotary engine characterized by having in combination two or more intermeshing and engaging rotors, shafts secured in said rotors and rotatably mounted in suitable bearings, each rotor having a plurality of right hand helically arranged tooth blades extending from one end of the rotor towards the center thereof, a plurality of left hand helically arranged tooth blades extending from the opposite end of each of said rotors toward the center thereof, the right hand blades of each rotor being in staggered relation to the left hand blades of the same rotor at substantially the center of the rotor, the right and left hand intermeshing tooth blades of the engaging rotors forming angular pockets, and a fluid inlet provided with a port arranged at the center of the rotors.

2. A rotary engine characterized by having in combination two or more intermeshing and engaging rotors; shafts secured in said rotors and rotatably mounted in suitable bearings, each rotor having a plurality of right hand helically arranged tooth blades extending from one end of the rotor toward the center thereof, a plurality of left hand helically arranged tooth blades extending from the opposite end of each of said rotors toward the center thereof, the right hand blades of each rotor being in staggered relation to the left hand blades of the same rotor at substantially the center of the rotor, the right and left hand intermeshing tooth blades of the engaging rotors forming angular pockets, a fluid inlet arranged at the center of the rotors and provided with a port, and a casing for the rotors, said casing extending up in between the rotors and around their peripheries for a distance sufficient to retain the fluid within the pocket formed by any pair of intermeshing tooth blades until the pocket formed by any pair of engaging tooth blades has reached its maximum volume.

In witness whereof, I have hereunto signed my name.

HENRY W. WENDT.